US012286168B2

(12) United States Patent
Ojima et al.

(10) Patent No.: US 12,286,168 B2
(45) Date of Patent: Apr. 29, 2025

(54) STEERING SYSTEM FOR VEHICLE

(71) Applicants: HONDA MOTOR CO., LTD., Tokyo (JP); THYSSENKRUPP PRESTA AKTIENGESELLSCHAFT, Eschen (LI)

(72) Inventors: Yosuke Ojima, Tokyo (JP); Munetsugu Hanji, Tokyo (JP); David Kulcsar, Lajosmizse (HU); Imre Szepessy, Mauren (LI); Laszlo Dombai, Erd (HU); Peter Kakas, Budapest (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 246 days.

(21) Appl. No.: 18/002,550

(22) PCT Filed: Mar. 31, 2021

(86) PCT No.: PCT/JP2021/014018
§ 371 (c)(1),
(2) Date: Dec. 20, 2022

(87) PCT Pub. No.: WO2022/208804
PCT Pub. Date: Oct. 6, 2022

(65) Prior Publication Data
US 2023/0227097 A1 Jul. 20, 2023

(51) Int. Cl.
*G05D 1/00* (2024.01)
*B62D 5/00* (2006.01)
(Continued)

(52) U.S. Cl.
CPC ............. *B62D 5/003* (2013.01); *B62D 5/006* (2013.01); *B62D 5/0484* (2013.01); *B62D 6/008* (2013.01); *B62D 15/0215* (2013.01)

(58) Field of Classification Search
CPC ..................................................... B62D 6/008
See application file for complete search history.

(56) References Cited

U.S. PATENT DOCUMENTS

| 6,219,604 B1 | 4/2001 | Dilger et al. |
| 6,523,637 B1 | 2/2003 | Nakano et al. |

(Continued)

FOREIGN PATENT DOCUMENTS

| DE | 19902557 A1 * | 7/2000 | ............. B62D 5/006 |
| DE | 19912169 A1 | 7/2000 | |

(Continued)

OTHER PUBLICATIONS

PCT International Search Report for Patent Application PCT/JP2021/014018 mailed Dec. 12, 2021; 4 pp.

(Continued)

*Primary Examiner* — Redhwan K Mawari
*Assistant Examiner* — Paul W Arellano
(74) *Attorney, Agent, or Firm* — Armstrong Teasdale LLP

(57) ABSTRACT

In a steer-by-wire steering system for a vehicle, a control unit (16) controls an operation of a steering actuator to cause the steered angle of wheels to be in a prescribed relationship to a steering angle, and an operation of a reaction force actuator (15) including a pair of reaction force motors (14) to cause the reaction force to be a value (Tt) corresponding to a steered state of the wheels, wherein the control unit is provided with a failure detection unit (36) configured to detect failures of the reaction force motors, and upon detecting a failure of one of the reaction force motors, progressively reduce an output (Tta) of the other reaction motor to a prescribed limit value (TL).

12 Claims, 5 Drawing Sheets

(51) Int. Cl.
  *B62D 5/04* (2006.01)
  *B62D 6/00* (2006.01)
  *B62D 15/02* (2006.01)

(56) References Cited

U.S. PATENT DOCUMENTS

| | | | |
|---|---|---|---|
| 2019/0016378 A1 | 1/2019 | Itou et al. | |
| 2019/0168807 A1* | 6/2019 | Polmans | B62D 5/0484 |
| 2020/0047764 A1* | 2/2020 | Yamashita | B60W 30/18145 |

FOREIGN PATENT DOCUMENTS

| | | |
|---|---|---|
| DE | 102018201001 A1 | 7/2019 |
| EP | 1062143 A1 | 12/2000 |
| JP | H10218000 A | 8/1998 |
| JP | 2002535192 A | 10/2002 |
| JP | 2012139097 A | 7/2012 |
| WO | 2017122562 A1 | 7/2017 |
| WO | 2018029198 A1 | 2/2018 |

OTHER PUBLICATIONS

Notice of Reasons for Refusal for Japanese Patent Application No. 2022-521098 dated Jun. 20, 2023; 6 pp.

* cited by examiner

STEERING SYSTEM FOR VEHICLE

CROSS-REFERENCE TO RELATED APPLICATION

This application is a U.S. National Phase Application of PCT/JP2021/014018, filed on Mar. 31, 2021. The content of this application is hereby expressly incorporated by reference in its entirety.

TECHNICAL FIELD

The present invention relates to a steer-by-wire steering system for a vehicle.

BACKGROUND ART

Known is a steer-by-wire steering system for a vehicle which includes a steering member such as a steering wheel configured to be operated by a driver, and a steering mechanism mechanically separated from the steering member and configured to change the steered angle of the wheels. The steering mechanism is driven by a steering actuator that generates a driving force to change the steered angle of the wheels. A reaction force actuator applies a reaction force to the steering member in response to the steering operation.

In such a steer-by-wire steering system, it is known to provide a pair of steering motors at different positions of the steering mechanism to prevent the steering force from becoming unavailable even if either one of the steering motors should fail (Patent Document 1). In this steering system, under normal operating condition, the control unit determines the target output values for the two steering motors by distributing the required steering force between the two steering motors at a predetermined ratio. When one of the steering motors has failed, the control unit changes the distribution ratio so that the output of the failed steering motor is prohibited, and the output of the other steering motor or the healthy steering motor is increased. As a result, the steering operation is performed solely by the healthy steering motor.

CITATION LIST

[Patent Literature 1] JPH10-218000A

SUMMARY OF THE INVENTION

Technical Problem

However, the steering system disclosed in Patent Document 1 is provided with only one reaction force motor as the reaction force actuator. Therefore, when the reaction force motor should fail, the steering reaction force applied to the steering member may suddenly decrease. In such a case, the driver tends to excessively turn the steering member so that the vehicle may be steered more than intended by the driver.

Here, it is conceivable to apply the concept of using two electric motors for the steering actuator taught in Patent Document 1 to the reaction force actuator. In such a case, if one of the reaction force motors should fail, the output of the other reaction force motor will be increased to make up for the loss of the failed reaction force motor. As a result, the driver is able to operate the vehicle without any inconvenience with the remaining reaction force motor. However, if the remaining reaction force motor should also fail possibly while cornering, due to a sudden loss or reduction of the reaction force, the driver is likely to turn the steering wheel so that the vehicle may be steered more than intended by the driver.

Based on such a background, a primary object of the present invention is to prevent the steering member from being excessively operated in case of a failure in a reaction force motor of a steer-by-wire steering system, and thereby prevent the vehicle from being steered more than intended by the driver.

Solution of Problem

To achieve such an object, the present invention provides a steering system (1) for a vehicle (2), comprising: a steering member (10) configured to receive a steering operation; a steering mechanism (11) mechanically separated from the steering member and configured to steer wheels (3); a steering angle sensor (21) that detects a steering angle (p) of the steering member; a steered angle sensor (32) that detects a steered angle (a) of the wheels; a steering actuator (13) configured to provide a drive force to the steering mechanism; a reaction force actuator (15) including at least two reaction force motors and configured to apply a reaction force to the steering member in response to the steering operation; and a control unit (16) that controls an operation of the steering actuator to cause the steered angle to be in a prescribed relationship to the steering angle, and an operation of the reaction force actuator to cause the reaction force to be a value (Tt) corresponding to a steered state of the wheels, wherein the control unit is provided with a failure detection unit (36) configured to detect failures of the reaction force motors, and upon detecting a failure of all but one of the reaction force motors, progressively reduce an output (Tta) of the remaining reaction motor to a prescribed limit value (TL).

Thereby, even if the remaining reaction motor should also fail during cornering following the failure of the one reaction motor, since the output of the other reaction motor progressively decreases to the prescribed limit value, an abrupt loss of the steering reaction force can be avoided so that the driver is prevented from operating the steering member in an excessive manner.

Preferably, the control unit controls the reaction force motors to share an output of the reaction actuator at a predetermined distribution ratio during normal operation of the reaction force actuator.

Thereby, without regard to which of the reaction force motors should fail, the resulting reduction in the reaction force is the same, and the drop in the reaction force at such a time can be minimized.

Preferably, the limit value is equal to or greater than a value (such as 1 Nm) that allows the steering member to be driven by the reaction force actuator while no external force is applied to the steering member.

Thus, the reaction force actuator can drive the steering member by the output of the remaining reaction motor that has not failed. Therefore, when the driver releases the steering member during cornering, the control unit drives the reaction force motor such that the steering member is returned to the neutral position similarly as when the wheels and the steering member are returned to the neutral position by the self-aligning torque. Once the steering angle and the steered angle both become zero, the driver can readily recognize that the vehicle is traveling straight ahead from the steering member placed at the neutral position.

Preferably, the steering member includes a steering wheel (19) that is rotatable around an axis of a steering shaft (18), and the limit value is smaller than a value that is required to cancel a torque (6.35 Nm, for instance) corresponding to a loading of a weight of an arm of a driver placed on the steering wheel.

Thereby, after the control unit has reduced the output of the remaining reaction force motor to the limit value, if the driver applies only the load corresponding to the weight of one arm to the steering wheel, the steering wheel rotates in the direction in which the load is applied. Since the weight of the arm is enough to rotate the steering wheel, the driver is required to apply some effort to the arm to keep the steering wheel stationary. Thus, in order to keep the steering wheel stationary, the driver is required to grip the steering wheel with both hands, or in case the steering wheel is gripped by only one hand, to put some effort to the hand gripping the steering wheel. By so doing, even if the other reaction force motor fails after the output of the other reaction force motor has dropped to the limit value, and the reaction force is totally lost, the driver is prevented from excessively turning the steering wheel.

Preferably, the control unit progressively reduces the output of the remaining reaction force motor at a reduction rate (R) which gets smaller as a vehicle speed (V) increases.

Since the reduction rate of the output of the reaction force motor becomes smaller in a high vehicle speed traveling condition than in a low speed traveling condition, the steering member is prevented from being operated in a way not intended by the driver. Therefore, the capability of the vehicle to travel straight ahead can be improved.

Preferably, the control unit progressively reduces the output of the remaining reaction force motor at a reduction rate which is larger when the vehicle is cornering than when the vehicle is traveling straight ahead.

When the vehicle is cornering, the driver applies an operating force to the steering member. Therefore, when the steering reaction force decreases rapidly during cornering, the balance between the steering force applied by the driver and the steering reaction force is broken so that the steering member may be operated too rapidly. However, according to this arrangement, since the reduction rate of the output of the reaction motor is small during cornering, the driver can have time to familiarize with the reduction in the steering reaction force so that an unintended rapid movement of the steering member can be avoided.

Preferably, the control unit progressively reduces the output of the remaining reaction force motor only when an absolute value ($|\beta|$) of the steering angle is larger than a predetermined value ($\beta$th).

If the output of the reaction force motor is reduced while the vehicle is traveling straight, and the vehicle thereafter goes into a turn (the steering angle is increased beyond the predetermined value), since the steering reaction force is smaller than expected by the driver, the driver is likely to excessively operate the steering member. According to this arrangement, since the output of the reaction force motor is not reduced substantially while the vehicle is traveling straight ahead, the steering member is prevented from being operated excessively during a subsequent cornering.

Preferably, the steering system further comprises a vibration device (15) for vibrating the steering member, wherein the control unit is configured to control the operation of the vibration device such that the vibration device is activated so as to vibrate the steering member while the vehicle is traveling straight and the output of the remaining reaction force motor is being progressively reduced.

By thus vibrating the steering member while the vehicle is traveling straight, the driver can be made aware that the steering reaction force is being reduced.

Preferably, the control unit drives the vibration device only while the vehicle is traveling straight, and controls the steering actuator so as not to change the steering angle while driving the vibration device.

Thereby, the vehicle is prevented from meandering due to the vibration of the steering member when the vehicle is traveling straight.

Advantageous Effects of Invention

Thus, according to the above-mentioned structure, the steering member is prevented from being excessively operated in case of a failure of all but one of the reaction force motors of a steer-by-wire steering system so that the vehicle is prevented from being steered more than intended by the driver.

DESCRIPTION OF EMBODIMENTS

Figure 1:
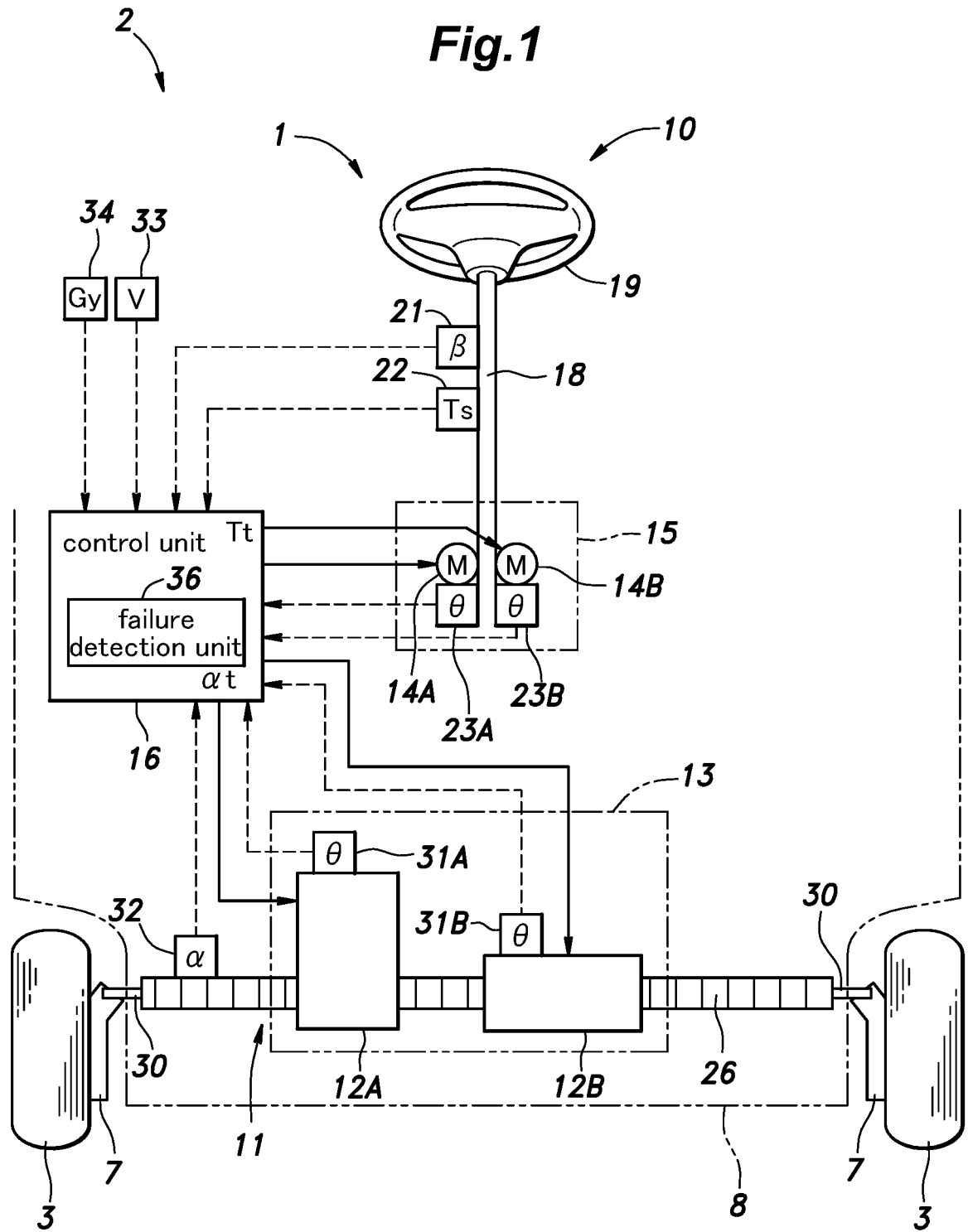
FIG. 1 is a schematic diagram of a steering system according to an embodiment of the present invention.

A steering system 1 for a vehicle 2 according an embodiment of the present invention is described in the following. As shown in FIG. 1, the steering system 1 consists of a steer-by-wire (SBW) steering system. The vehicle 2 fitted with the steering system 1 is a four-wheeled vehicle having left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the steered angle α of the front wheels 3 can be changed, and the front wheels 3 thus serve as steerable wheels. The steered angle α refers to the angle of the front wheels 3 with respect to the fore and aft direction in plan view. The steering system 1 thus changes the steered angle α of the front wheels 3.

The steering device 1 includes a steering member 10 operably provided on the vehicle body 8 and a steering mechanism 11 for steering the front wheels 3. The steering mechanism 11 is provided with a steering actuator 13 including two steering motors 12 (a first steering motor 12A, and a second steering motor 12B) that provide a driving force. Hereinafter, the two steering motors 12 may each be collective referred to as the steering motor 12 without distinguishing which is being referred to. The steering member 10 is provided with a reaction force actuator 15 including two reaction force motors 14 (a first reaction force motor 14A, and a second reaction force motor 14B) that provide a reaction torque T. Hereinafter, the reaction force motors 14 may each be collective referred to as the reaction force motor 14 without distinguishing which is being referred to. The operation of the steering actuator 13 and the reaction force actuator 15 is controlled by the control unit 16. The steering actuator 13 and the reaction force actuator 15 are thus formed as redundant systems including the two steering motors 12 and the two reaction force motors 14, respectively. The control unit 16 may also be a redundant system in which a plurality of the control units 16 are provided.

The steering member 10 accepts a steering operation (steering input) by the driver. The steering member 10 includes a steering shaft 18 rotatably supported by the vehicle body 8 and a steering wheel 19 provided at an end of the steering shaft 18. The steering shaft 18 is rotatably supported by a steering column 20 provided on the vehicle body 8, and has a rear end thereof projecting rearward from the steering column 20. The steering wheel 19 is connected to the rear end of the steering shaft 18 so as to rotate integrally with the steering shaft 18.

The two reaction force motors 14 each consist of an electric motor which is connected to the steering shaft 18 via a gear mechanism. When the reaction force actuator 15 is driven by supplying electric power to the reaction force motors 14, the output (torque) of the reaction force motors 14 is transmitted to the steering shaft 18 as a rotational force (torque). The reaction force actuator 15 applies a torque to the steering member 10 as a reaction torque T in response to the steering operation.

The steering system 1 is further provided with a steering angle sensor 21 that detects the rotational angle of the steering shaft 18 around the central axis thereof as a steering angle $\beta$. The steering angle sensor 21 may be a per se known rotary encoder. Further, the steering system 1 is provided with a torque sensor 22 that detects the torque applied to the steering shaft 18 as a steering torque Ts. The torque sensor 22 detects the steering torque Ts applied to a part of the steering shaft 18 located between the steering wheel 19 and the reaction force actuator 15. The steering torque Ts is determined by the operating torque applied to the steering wheel 19 by the driver and the reaction torque T applied to the steering shaft 18 by the reaction force actuator 15. The torque sensor 22 may consist of a per se known torque sensor such as a magnetostrictive torque sensor or a strain gauge, or, alternatively, the steering torque may be estimated from the value of the electric current flowing through the electric motors of the reaction force actuator 15.

The steering system 1 further includes a pair of first rotational angle sensors 23 that detect the rotational angles $\theta$ of the first reaction force motor 14A and the second reaction force motor 14B, respectively. The first rotational angle sensors 23 may each consist of a per se known resolver or rotary encoder.

The steering mechanism 11 has a rack 26 extending in the vehicle lateral direction. The rack 26 is supported by a gear housing 27 (not shown in the drawings) so as to be movable in the vehicle lateral direction. The left and right ends of the rack 26 are respectively connected to knuckles 7 that support the left and right front wheels 3 via respective tie rods 30. As the rack 26 moves in the vehicle lateral direction, the steered angle $\alpha$ of the front wheels 3 changes. The steering mechanism 11 is mechanically separated from the steering member 10.

The two steering motors 12 each consist of an electric motor. When the steering actuator 13 is in operation by supplying electric power to at least one of the steering motors 12, the output (torque) of the electric motor or electric motors is converted into a lateral force that acts as a drive force on the rack 26. As the rack 26 moves laterally, the steered angle $\alpha$ of the left and right front wheels 3 changes accordingly.

The steering system 1 has a pair of second rotational angle sensors 31 (31A, 31B) that detect the rotational angles $\theta$ of the two steering motors 12, respectively. Each second rotational angle sensor 31 may be a per se known resolver or rotary encoder. Further, the steering system 1 has a steered angle sensor 32 that detects the steered angle $\alpha$ of the front wheels 3. In the present embodiment, the steered angle sensor 32 is a rack stroke sensor that detects the rack position or the position of the rack 26 in the lateral direction, and detects the steered angle $\alpha$ of the front wheels 3 from the rack position.

The control unit 16 is an electronic control unit including a CPU, memory, a storage device for storing a program, and the like. The steering angle sensor 21, the torque sensor 22, the two first rotational angle sensors 23, the two second rotational angle sensors 31, and the steered angle sensor 32 are connected to the control unit 16. Based on the signals from these sensors, the control unit 16 acquires the steering angle $\beta$, the steering torque Ts, the rotational angles $\theta$ of the reaction force motors 14, the rotational angles $\theta$ of the steering motors 12, and the steered angle $\alpha$. Further, the control unit 16 is connected to a vehicle speed sensor 33 and a lateral acceleration sensor 34, and acquires the vehicle speed V, the lateral acceleration Gy of the vehicle body 8.

The control unit 16 is connected to the reaction force actuator 15 and the steering actuator 13 to control the reaction force actuator 15 (two reaction force motors 14) and the steering actuator 13 (two steering motors 12). The control unit 16 controls the steering actuator 13 according to the steering angle $\beta$, and controls the reaction force actuator 15 according to the steered angle $\alpha$.

The control action of the control unit 16 in the SBW mode is specifically described in the following. The control unit 16 computes a target steered angle $\alpha t$ having a prescribed relationship with the steering angle $\beta$ according to the actual steering angle $\beta$ detected by the steering angle sensor 21. The control unit 16 may compute the target steered angle $\alpha t$ by, for example, multiplying the steering angle $\beta$ by a predetermined gear ratio K ($\alpha t = \beta \times K$). The gear ratio K may be, for example, 0.01 to 0.5, and is preferably 0.125. Then, the control unit 16 computes a first current value A1 to be supplied the steering actuator 13 according to the deviation $\Delta\alpha(=\alpha t-\alpha)$ between the target steered angle $\alpha t$ and the actual steered angle $\alpha$ so that the steered angle $\alpha$ coincides with the target steered angle $\alpha t$. In other words, the control unit 16 performs a feedback control of the steering actuator 13 according to the deviation $\Delta\alpha$. The control unit 16 distributes the first current values A1 between the first steering motor 12A and the second steering motor 12B at a predetermined distribution ratio (for example, 50%:50%). The first current value A1 supplied to the steering actuator 13 increases as the deviation $\Delta\alpha$ increases, and the output of the steering actuator 13 increases as the first current value A1 increases, causing the change rate of the steered angle $\alpha$ to increase.

The control unit 16 computes a target reaction torque Tt to be generated by the reaction force motors 14 according to the steered state of the front wheels 3, in particular according to the deviation $\Delta\alpha$. The target reaction torque Tt is set larger as the deviation $\Delta\alpha$ of the steered angle $\alpha$ gets larger. The target reaction torque Tt may be computed by multiplying $\Delta\alpha$ by a predetermined coefficient.

The control unit 16 distributes the target reaction torque Tt between the first reaction force motor 14A and the second reaction force motor 14B. The distributed target reaction torques for the first reaction force motor 14A and the second reaction force motor 14B are denoted by Tta and Ttb, respectively. When a failure of the reaction force motors 14 is not detected, the distribution reaction torque Tta of the first reaction force motor 14A and the distribution reaction torque Ttb of the second reaction force motor 14B are computed so as to have an equal distribution ratio of 50%:50%, for example. Then, the control unit 16 computes the second current value A2 to be supplied to each reaction force motor 14 based on the corresponding distributed reaction torques Tta and Ttb that are computed. The current value (which is distributed between the first reaction force motor 14A and the second reaction force motor 14B) to be supplied to the reaction force motors 14 may be determined by referring to a predetermined map for the target reaction torque Tt.

The control unit 16 supplies the second current value A2 to the reaction force motors 14, and generates an output (torque) in the reaction force actuator 15. The output of the reaction force actuator 15 is applied to the steering shaft 18 as a reaction torque T that opposes the operation input of the driver. As a result, the driver can receive a reaction force (resistance force) against the steering operation from the steering wheel 19.

Further, the control unit 16 can apply a small rotational vibration to the steering wheel 19 by adding a component that alternately reverse in sign at a high frequency to the current value A2 supplied to the reaction force motors 14. The rotational vibration of the steering wheel 19 is used as an alarm to the driver holding the steering wheel 19. At this time, the reaction force actuator 15 functions as a vibrating device that vibrates the steering member 10. The control unit 16 controls the reaction force actuator 15 so as to function as a vibration device.

Further, the control unit 16 includes a failure detection unit 36 that detects a failure in any of the steering motors 12 and the reaction force motors 14. For instance, when one of the reaction motors 14 fails, the available reaction torque is reduced by half. Thereby, it can be determined that one of the reaction motors 14 has failed. When it is determined that one of the reaction motors 14 has failed, the failure detection unit 36 supplies a torque command value to the first reaction force motor 14A and the second reaction motor 14B in a sequential manner to cause the reaction force motors 14 to produce a reaction torque T individually. By determining if the corresponding reaction torque is produced by each of the reaction force motors 14, the failure detection unit 36 can identify which of the reaction force motors 14 has failed.

Figure 2:
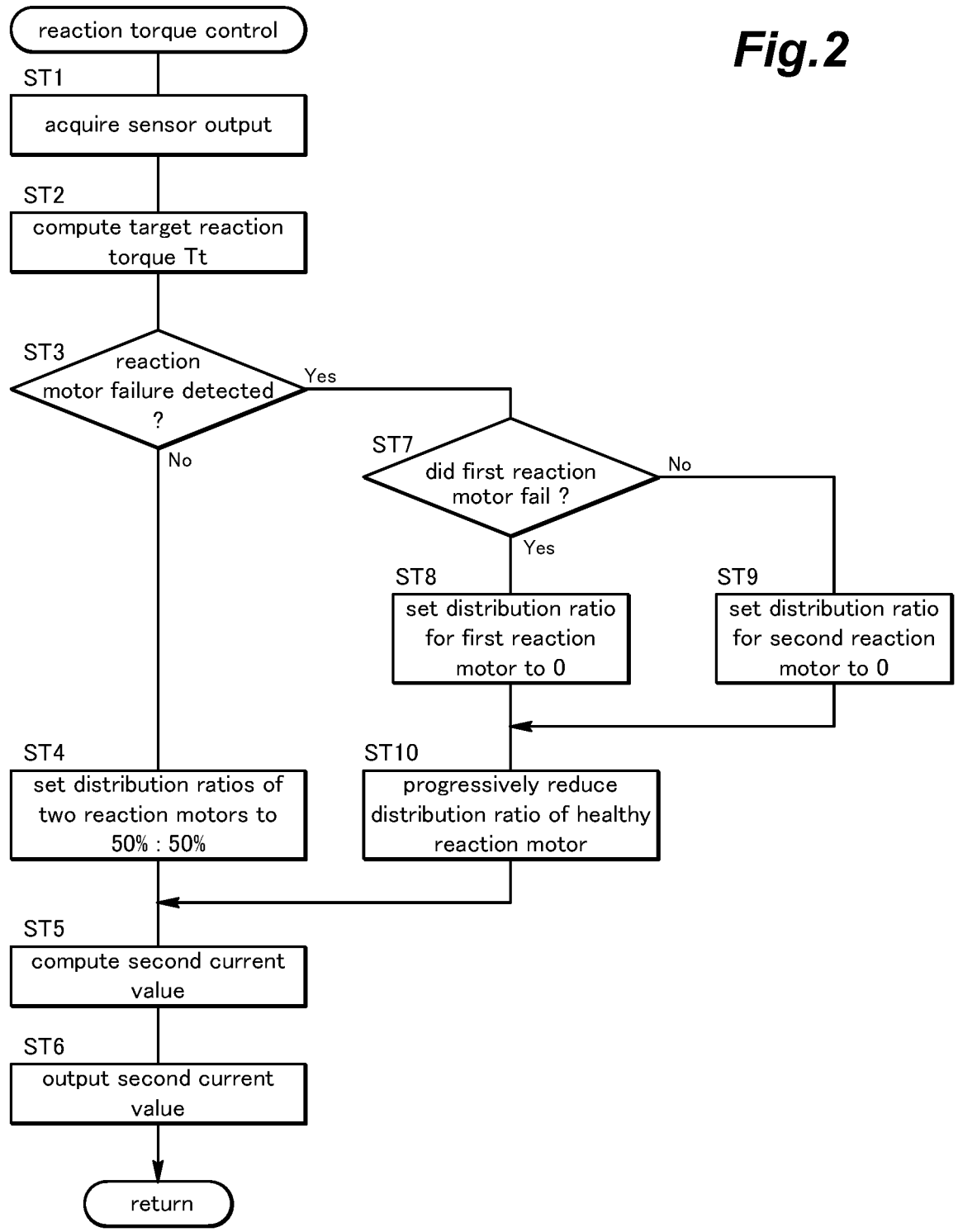
FIG. 2 is a flowchart of a reaction torque control executed by a control unit.

FIG. 2 is a flowchart of the reaction torque control executed by the control unit 16. When the control unit 16 is activated, the control unit 16 starts executing the reaction torque control process described in the following. First, the control unit 16 acquires the output of each sensor (step ST1). Next, the control unit 16 computes the target reaction torque Tt (total value) to be generated jointly by the reaction force motors 14 based on the deviation Δα of the steered angle α (step ST2). The control unit 16 determines if a failure of either one of the reaction force motors 14 has been detected by the failure detection unit 36 (step ST3). When a failure of the reaction force motors 14 is not detected (ST3: No), the control unit 16 sets the distribution ratio of the two reaction force motors 14 to 50%:50%, which is the normal distribution ratio as described above (step ST4).

Subsequently, the control unit 16 computes the second current value A2 to be supplied to the reaction force motors 14, and the second current value A2 is distributed between the two reaction force motors 14 at the above-mentioned distribution ratio (Step ST5). The control unit 16 supplies the computed second current value A2 to the reaction force motors 14 (step ST6). As a result, the output of the reaction force actuator 15 is applied to the steering member 10 as the reaction torque T. After outputting the second current value A2 in step ST6, the control unit 16 repeats the above procedure.

On the other hand, when a failure of any of the reaction force motors 14 is detected in step ST3 (ST3: Yes), the control unit 16 determines if the first reaction force motor 14A has failed (step ST7). When a failure of the first reaction force motor 14A is detected (ST7: Yes), the control unit 16 sets the distribution ratio of the first reaction force motor 14A to 0 (step ST8). When the failure of the first reaction force motor 14A is not detected (ST7: No), the control unit 16 sets the distribution ratio of the second reaction force motor 14B to 0 (step ST9). Subsequently, the control unit 16 progressively reduces the distribution ratio of the other reaction force motor 14 which has not failed (hereinafter, simply referred to as "healthy reaction force motor 14") from the normal distribution ratio of 50% (step ST10). In step ST10, the output of the healthy reaction force motor 14 is incrementally decreased before the control flow proceeds to step ST5. Again, the second current value is computed in step ST5, and the second current value A2 is output in step ST6. This process is repeated until the output of the reaction force actuator 15 reaches the limit value and is kept at this value.

Figure 3:
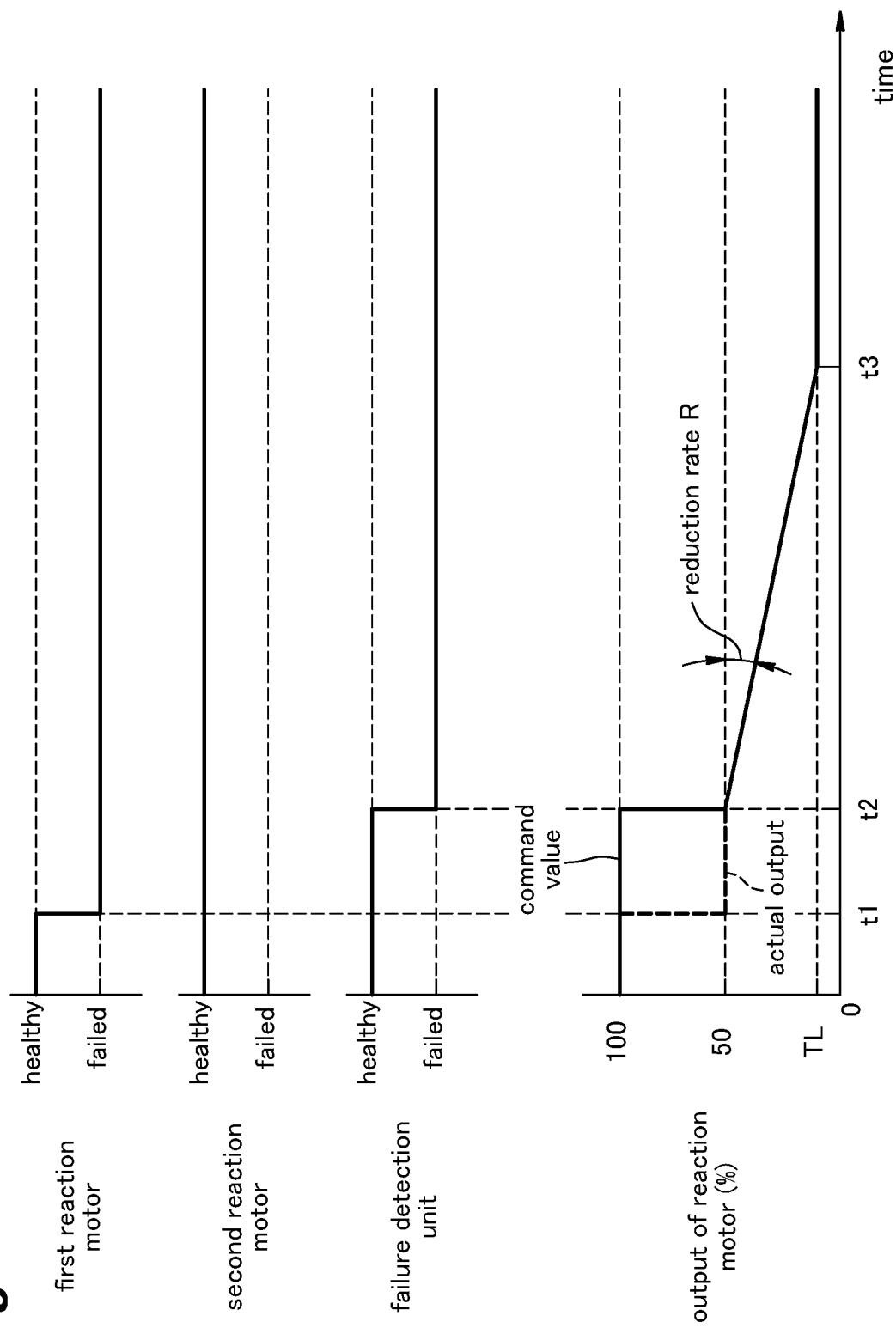
FIG. 3 is a time chart showing a typical mode of operation of the steering system.

When the control unit 16 executes the reaction torque control in this way, the reaction torque T, which is the output of the reaction force motor 14, changes as discussed in the following. FIG. 3 is a time chart showing an example of the operation of the steering system 1. As shown in FIG. 3, one of the first reaction force motor 14A and the second reaction force motor 14B (the first reaction force motor 14A in the illustrated example) that has been operating normally fails at the time point t1. The failure detection unit 36 of the control unit 16 identifies the failed reaction force motor 14 at the time point t2. Upon identifying the failed reaction motor 14, the control unit 16 sets the output of the failed reaction motor 14 to 0, and starts progressively reducing the output of the normal reaction motor 14 from 50% to a predetermined limit value TL (ramp down process). As the ramp down process progresses, the output of the healthy reaction force motor 14 reaches the limit value TL at the time point t3. After the time point t3, the control unit 16 maintains the output of the healthy reaction force motor 14 at the limit value TL. The limit value TL may be any value as long as the value is lower than the normal distribution ratio of the healthy reaction force motor 14, or the value of 50%.

In this way, when a failure of one of the reaction force motors 14 is detected, the control unit 16 progressively reduces the output of the healthy reaction force motor 14 to the predetermined limit value TL. As a result, the output of the reaction force motor 14 is progressively reduced to the predetermined limit value TL at the time point t3, and the driver is familiarized with a reduction in the reaction torque so that even if the healthy reaction force motor 14 fails during a cornering maneuver of the vehicle 2, the reaction torque T is never abruptly lost. Therefore, the driver is prevented from excessively turning the steering wheel 19 due to an absence of the reaction torque T.

The limit value TL is expressed as a percentage here, or, more specifically, a percentage to the normal reaction torque value. Typically, the limit value TL is a value equal to or higher than a value at which the reaction force actuator 15 can rotationally drive the steering wheel 19 in absence of any external force such as the steering torque applied to the steering wheel 19 by the driver. Since the steering member 10 generates a rotational friction during the rotational operation, the limit value TL is preferably 1 Nm or more as a value that can overcome this frictional resistance. Preferably, the limit value TL is smaller than the output of the reaction force motor 14 required to cancel the torque that is applied to the steering wheel 19 when the load corresponding to the weight of an arm of the driver acts on the steering wheel 19. Assuming that the load of the arm of the driver is 3.5 kg force and the radius of the steering wheel 19 is 0.18 m, the torque applied by the weight of an arm of the driver to the steering wheel 19 is 6.35 Nm. Therefore, the limit value TL is preferably 1 Nm or more and less than 6.35 Nm.

By setting the limit value TL to 1 Nm or more in this way, the reaction force actuator 15 can drive the steering member 10 by the output of the healthy reaction force motor 14. Therefore, when the driver releases the steering wheel 19 during cornering, the control unit 16 can drive the reaction actuator 15 so as to return the steering member 10 to the neutral position in a similar way as the self-alignment torque returns the front wheels 3 and the steering member 1 to the neutral position. Further, since the steering angle $\beta$ and the steered angle $\alpha$ both become 0° as a result, the driver can readily recognize that the vehicle is traveling straight from the steering wheel 19 which is in the neutral position.

Further, by setting the limit value TL to less than 6.35 Nm, if the driver applies the load corresponding to the weight of one arm to the steering wheel 19 while the control unit 16 controls the output of the healthy reaction force motor 14 to the limit value TL, the steering wheel 19 rotates in the direction of the load applied by the arm. In other words, the weight of one arm applied to the steering wheel 19 is enough to cause the steering wheel 19 to be turned. Thus, when the driver tries to drive the vehicle to travel straight ahead, he needs to grip the steering wheel 19 with both hands. If the driver grips the steering wheel 19 with only one arm and tries to drive the vehicle to travel straight ahead, he needs to place some effort on the arm gripping the steering wheel 19. Therefore, even if the reaction force motor 14 has failed, and the reaction torque T is maximally reduced, the driver is prevented from turning the steering wheel 19 excessively.

The progressive reduction process or the ramp down process is described in the following. When progressively reducing the output of the healthy reaction force motor 14, the control unit 16 selects a reduction rate R of the output, and progressively reduces the output of the healthy reaction force motor 14 according to the selected reduction rate R. The reduction rate R as used herein should be interpreted in a broad sense. In this embodiment, the progressive reduction in the reaction torque is linear, or the reaction torque is reduced by a fixed increment for each unit time. The greater the reduction rate R is, the greater the size of the increment by which the reaction torque is reduced for each unit time becomes. In other words, the greater the reduction rate R is, the shorter the time period over which the output of the reaction motor 14 decreases from the 50% value to the limit value TL becomes. The control unit 16 may set the reduction rate R as a variable value instead of a constant value. For example, the reduction rate R may be computed in such a way that the control unit 16 sets the standard reduction rate to 5%/sec as a standard value of the reduction rate R, and changes the reduction rate RS according to various parameters indicating the dynamic state of the vehicle 2.

Figure 4A:
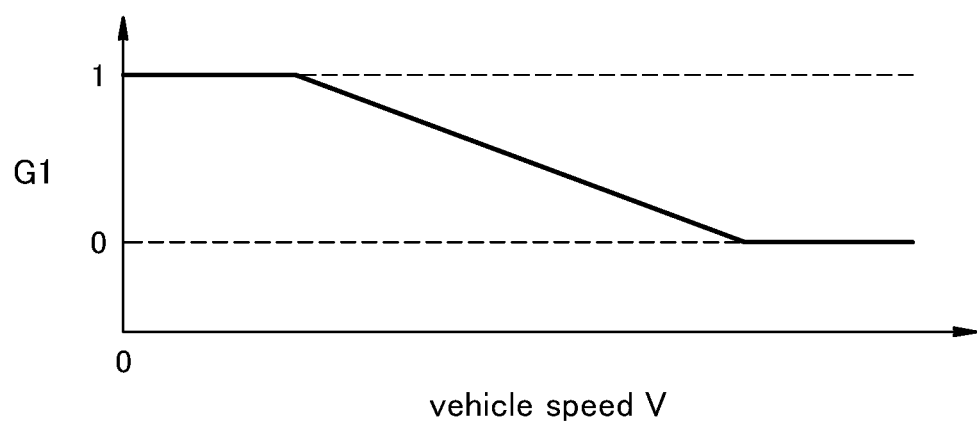
FIG. 4A shows a gain map of a reduction rate depending on vehicle speed.
Figure 4B:
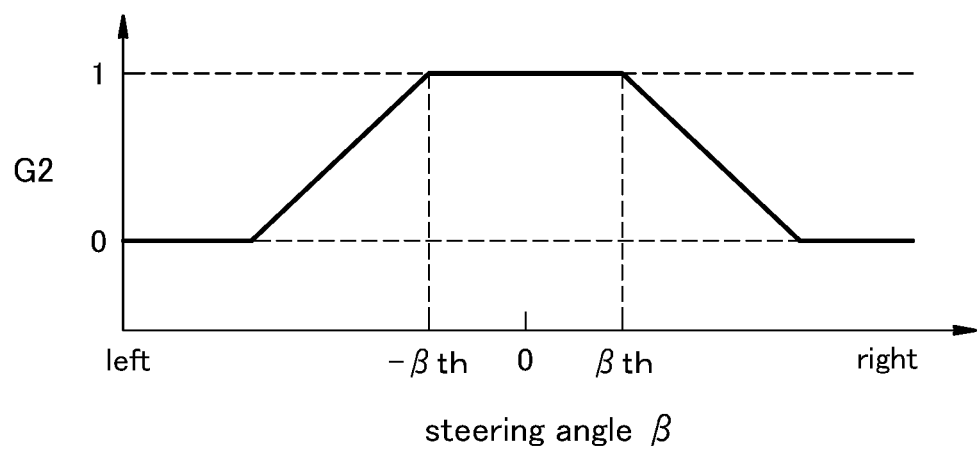
FIG. 4B shows a gain map of a reduction rate depending on steering angle.

More specifically, the control unit 16 may compute the reduction rate R as discussed in the following. FIG. 4 is a gain map for setting the reduction rate; (A) shows the vehicle speed gain G1 and (B) shows the steering angle gain G2. As shown in FIG. 4(A), the vehicle speed gain G1 is set so that the higher the vehicle speed V is, the smaller the vehicle speed gain G1 becomes. As shown in FIG. 4(B), the steering angle gain G2 is set so that the larger the absolute value of the steering angle $\beta$ is, the smaller the steering angle gain G2 becomes. The steering angle gain G2 is set to 1 when the absolute value $|\beta|$ of the steering angle $\beta$ is equal to or less than a predetermined value $\beta$th or when the vehicle is traveling substantially straight. The control unit 16 sets the vehicle speed gain G1 from the vehicle speed gain map based on the vehicle speed V, and sets the steering angle gain G2 from the steering angle gain map based on the steering angle $\beta$. The control unit 16 computes the reduction rate R by multiplying the standard reduction rate RS by the vehicle speed gain G1 and the steering angle gain G2. Therefore, the reduction rate R during cornering is smaller than the reduction rate R during the traveling straight condition of the vehicle 2.

In this way, the control unit 16 sets the reduction rate R of the output of the healthy reaction force motor 14 to be smaller with an increase in the vehicle speed V. As a result, the reduction rate R of the output of the reaction force motor 14 becomes smaller when the vehicle is traveling at a high speed than when the vehicle is traveling at a low speed so that the steering wheel 19 is prevented from being steered against the driver's intention. In particular, the driver is gradually familiarized with the state where the effort required for the steering operation is significantly smaller. Therefore, the vehicle 2 is enabled to travel straight ahead in a stable manner.

Since the driver applies a steering torque to the steering wheel 19 during cornering of the vehicle 2, if the reaction torque T rapidly decreases during cornering, the balance between the steering torque of the driver and the reaction torque T may not be maintained so that the steering wheel 19 may be excessively turned. In the present embodiment, as shown in FIG. 4(B), the control unit 16 selects the reduction rate R of the output of the healthy reaction force motor 14 during cornering to be smaller than during straight traveling. Thus, since the reduction rate R of the output of the reaction force motor 14 is small during turning, the driver can be familiarized with the reduction of the reaction torque T, and unintentional excessive turning of the steering wheel 19 can be avoided.

If one of the reaction force motors 14 has failed, and the output of the other reaction force motor 14 continues to decrease while the vehicle 2 is traveling straight, since the reaction torque T may be smaller than expected during a subsequent cornering (where the absolute value of the steering angle $\beta$ is equal to or greater than the predetermined value $\beta$th), the driver may turn the steering wheel excessively during the subsequent cornering.

Therefore, in the present embodiment, the control unit 16 controls the reaction force actuator 15 so that the steering member 10 may function as a vibration device. For example, when one of the reaction force motors 14 fails, a vibration component can be superimposed on the output of the normal reaction force motor 14. As a result, the driver can be notified of the failure of one of the reaction force motors 14, recognize that the reaction torque T is decreasing, and is thereby urged to take necessary measures.

The control unit 16 may drive the reaction force actuator 15 as a vibration device for the steering member 10 only while the vehicle 2 is traveling straight. The control unit 16 controls the steering actuator 13 so that the steered angle $\alpha$ does not change while driving the reaction force actuator 15 as a vibration device. More specifically, the control unit 16 may perform a low-pass filter process on the steering angle β used for computing the target steered angle αt of the steering actuator 13. This prevents the target steered angle αt from changing in response to a minute change in the steering angle β. However, the control method of the steering actuator 13 is not limited to this. By controlling the steering actuator 13 in this way, the control unit 16 prevents the vehicle 2 from meandering due to the vibration of the steering member 10 while the vehicle 2 is traveling straight.

Figure 5:
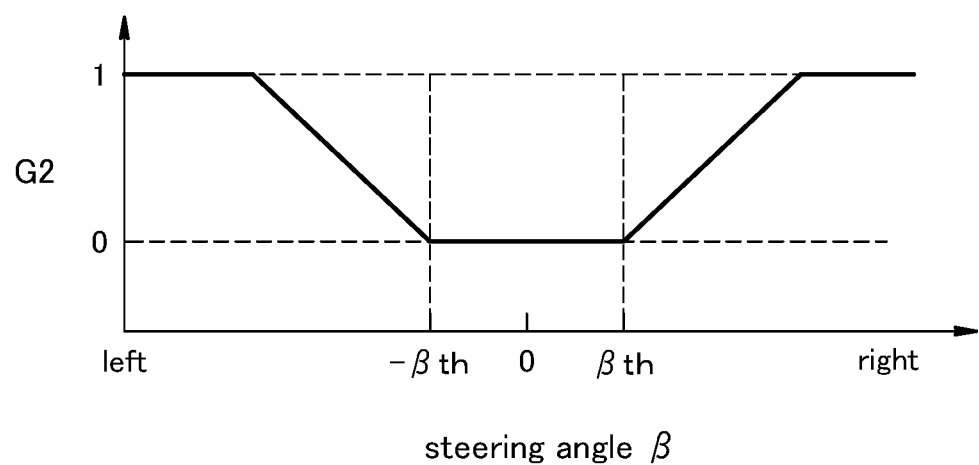
FIG. 5 is a gain map of a reduction rate depending on steering angle according to an alternate embodiment of the present invention.

FIG. 5 shows an alternate embodiment of the present invention. In this alternate embodiment, the steering angle gain G2 is substantially zero when the steering angle β is equal to or less than a predetermined value βth or when the vehicle is traveling substantially straight. Once the absolute value |β| of the steering angle β exceeds the predetermined value βth, the steering angle gain G2 starts increasing as the absolute value |β| of the steering angle β increases. Therefore, in this alternate embodiment, the reduction rate R of the reaction torque T is zero when the steering angle β is equal to or less than a predetermined value βth or when the vehicle is traveling substantially straight.

As a result, the output of the reaction force motor 14 does not decrease during straight running so that the steering wheel 19 is prevented from being excessively turned when the subsequent cornering maneuver is started. On the other hand, when the vehicle is cornering to a certain extent, the reduction rate R of the reaction torque can be a relatively large value. If the reaction torque T gradually decreases during cornering, the driver can be familiarized with the decrease in the reaction force torque T.

In this alternate embodiment, the steering wheel 19 may be vibrated when the vehicle is traveling straight, but since the reaction torque does not decrease when traveling straight in the alternate embodiment, the control unit 16 is not required to operate the reaction force actuator 15 as a vibration device. Rather, if the reaction force actuator 15 continues to be operated as a vibration device while the vehicle is traveling straight, the reaction force actuator 15 could overheat, and such a situation can be averted.

The present invention has been described in terms of specific embodiment, but is not limited by such embodiments, and can be modified in various ways without departing from the scope of the present invention. In the foregoing embodiments, the reaction force actuator 15 included a pair of reaction force motors 14. However, the reaction force actuator 15 may also include three or more of reaction force motors 14. In such a case, when a failure of all but one of the reaction force motors is detected, the control unit 16 progressively decreases the target reaction torque Tt of the remaining, normally operating reaction force motor 14.

Further, in the foregoing embodiments, the control unit 16 normally sets the distribution ratio of the two reaction force motors 14 to 50%:50%, but may also the ratio to 60%:40%, 70%:30%, or the like. In such a case, when one of the reaction force motors 14 fails, the control unit 16 may set the distribution ratio of the normal reaction force motors 14 to 50%, and then progressively reduce the output to a predetermined limit value TL. Alternatively, when one of the reaction force motors 14 fails, the control unit 16 may progressively reduce the output of the normal reaction force motor 14 from the current output value. Further, the distribution ratio of both steering motors 12 is not limited to 50%:50%.

Further, the reduction rate R can be defined as a measure of reduction proportional to each current value, and the reduction rate R in that case can be expressed by an exponential decay constant.

In addition, the specific configuration and arrangement of each member and part, quantity, angle, procedure, etc. can be appropriately changed as long as they do not deviate from the gist of the present invention. On the other hand, not all of the components shown in the above embodiments are indispensable, and they can be appropriately selected.

| [Reference Numerals] | |
|---|---|
| 1: steering system | 2: vehicle |
| 3: front wheel | 10: steering member |
| 11: steering mechanism | 13: steering actuator |
| 14: reaction force motor | 14A: first reaction motor |
| 14B: second reaction motor | 15: reaction force actuator |
| 16: control unit | 18: steering shaft |
| 19: steering wheel | 21: steered angle sensor |
| 32: steered angle sensor | 33: vehicle speed sensor |
| 34: lateral acceleration sensor | 36: failure detection unit |
| R: reduction rate | T: reaction torque (reaction force) |
| TL: limit value | Tt: target reaction torque |
| Tta, Ttb: distributed reaction torque (output) | |
| V: vehicle speed | α: steered angle |
| β: steering angle | βth: predetermined value |
| |β|: absolute value of the steering angle | |

The invention claimed is:

1. A steering system for a vehicle, comprising:
   a steering member configured to receive a steering operation;
   a steering mechanism mechanically separated from the steering member and configured to steer wheels;
   a steering angle sensor that detects a steering angle of the steering member; a steered angle sensor that detects a steered angle of the wheels;
   a steering actuator configured to provide a drive force to the steering mechanism; a reaction force actuator including at least two reaction force motors and configured to apply a reaction force to the steering member in response to the steering operation; and
   a control unit that controls an operation of the steering actuator to cause the steered angle to be in a prescribed relationship to the steering angle, and an operation of the reaction force actuator to cause the reaction force to be a value corresponding to a steered state of the wheels,
   wherein the control unit is provided with a failure detection unit configured to detect failures of the reaction force motors, and upon detecting a failure of all but one of the reaction force motors, progressively reduce an output of the remaining reaction force motor to a prescribed limit value,
   wherein the limit value is equal to or greater than a value that allows the steering member to be driven by the reaction force actuator while no external force is applied to the steering member.

2. A steering system for a vehicle according to claim 1, wherein the steering member includes a steering wheel that is rotatable around an axis of a steering shaft, and the limit value is smaller than a value that is required to cancel a torque corresponding to a loading of a weight of an arm of a driver placed on the steering wheel.

3. A steering system for a vehicle, comprising:
a steering member configured to receive a steering operation;
a steering mechanism mechanically separated from the steering member and configured to steer wheels;
a steering angle sensor that detects a steering angle of the steering member; a steered angle sensor that detects a steered angle of the wheels;
a steering actuator configured to provide a drive force to the steering mechanism; a reaction force actuator including at least two reaction force motors and configured to apply a reaction force to the steering member in response to the steering operation; and
a control unit that controls an operation of the steering actuator to cause the steered angle to be in a prescribed relationship to the steering angle, and an operation of the reaction force actuator to cause the reaction force to be a value corresponding to a steered state of the wheels,
wherein the control unit is provided with a failure detection unit configured to detect failures of the reaction force motors, and upon detecting a failure of all but one of the reaction force motors, progressively reduce an output of the remaining reaction force motor to a prescribed limit value,
wherein the control unit progressively reduces the output of the remaining reaction force motor at a reduction rate (R) which gets smaller as a vehicle speed increases.

4. A steering system for a vehicle, comprising:
a steering member configured to receive a steering operation;
a steering mechanism mechanically separated from the steering member and configured to steer wheels;
a steering angle sensor that detects a steering angle of the steering member; a steered angle sensor that detects a steered angle of the wheels;
a steering actuator configured to provide a drive force to the steering mechanism; a reaction force actuator including at least two reaction force motors and configured to apply a reaction force to the steering member in response to the steering operation; and
a control unit that controls an operation of the steering actuator to cause the steered angle to be in a prescribed relationship to the steering angle, and an operation of the reaction force actuator to cause the reaction force to be a value corresponding to a steered state of the wheels,
wherein the control unit is provided with a failure detection unit configured to detect failures of the reaction force motors, and upon detecting a failure of all but one of the reaction force motors, progressively reduce an output of the remaining reaction force motor to a prescribed limit value,
wherein the control unit progressively reduces the output of the remaining reaction force motor at a reduction rate which is larger when the vehicle is cornering than when the vehicle is traveling straight ahead.

5. A steering system for a vehicle, comprising:
a steering member configured to receive a steering operation;
a steering mechanism mechanically separated from the steering member and configured to steer wheels;
a steering angle sensor that detects a steering angle of the steering member; a steered angle sensor that detects a steered angle of the wheels;
a steering actuator configured to provide a drive force to the steering mechanism;
a reaction force actuator including at least two reaction force motors and configured to apply a reaction force to the steering member in response to the steering operation; and
a control unit that controls an operation of the steering actuator to cause the steered angle to be in a prescribed relationship to the steering angle, and an operation of the reaction force actuator to cause the reaction force to be a value corresponding to a steered state of the wheels,
wherein the control unit is provided with a failure detection unit configured to detect failures of the reaction force motors, and upon detecting a failure of all but one of the reaction force motors, progressively reduce an output of the remaining reaction force motor to a prescribed limit value,
wherein the control unit progressively reduces the output of the remaining reaction force motor only when an absolute value of the steering angle is larger than a predetermined value.

6. A steering system for a vehicle, comprising:
a steering member configured to receive a steering operation;
a steering mechanism mechanically separated from the steering member and configured to steer wheels;
a steering angle sensor that detects a steering angle of the steering member; a steered angle sensor that detects a steered angle of the wheels;
a steering actuator configured to provide a drive force to the steering mechanism; a reaction force actuator including at least two reaction force motors and configured to apply a reaction force to the steering member in response to the steering operation; and
a control unit that controls an operation of the steering actuator to cause the steered angle to be in a prescribed relationship to the steering angle, and an operation of the reaction force actuator to cause the reaction force to be a value corresponding to a steered state of the wheels,
wherein the control unit is provided with a failure detection unit configured to detect failures of the reaction force motors, and upon detecting a failure of all but one of the reaction force motors, progressively reduce an output of the remaining reaction force motor to a prescribed limit value,
wherein the steering system further comprises a vibration device for vibrating the steering member, wherein the control unit is configured to control the operation of the vibration device such that the vibration device is activated so as to vibrate the steering member while the vehicle is traveling straight and the output of the remaining reaction force motor is being progressively reduced.

7. A steering system for a vehicle according to claim 6, wherein the control unit drives the vibration device only while the vehicle is traveling straight, and controls the steering actuator so as not to change the steering angle while driving the vibration device.

8. A steering system for a vehicle according to claim 1, wherein the control unit controls the reaction force motors to share an output of the reaction actuator at a predetermined distribution ratio during normal operation of the reaction force actuator.

9. A steering system for a vehicle according to claim 3, wherein the control unit controls the reaction force motors to share an output of the reaction actuator at a predetermined distribution ratio during normal operation of the reaction force actuator.

10. A steering system for a vehicle according to claim 4, wherein the control unit controls the reaction force motors to share an output of the reaction actuator at a predetermined distribution ratio during normal operation of the reaction force actuator.

11. A steering system for a vehicle according to claim 5, wherein the control unit controls the reaction force motors to share an output of the reaction actuator at a predetermined distribution ratio during normal operation of the reaction force actuator.

12. A steering system for a vehicle according to claim 6, wherein the control unit controls the reaction force motors to share an output of the reaction actuator at a predetermined distribution ratio during normal operation of the reaction force actuator.

* * * * *